April 7, 1959
A. E. BLOUNT
2,880,966
CHARGE-PLANTING MOTOR-BIT DRILL
Filed Jan. 14, 1957
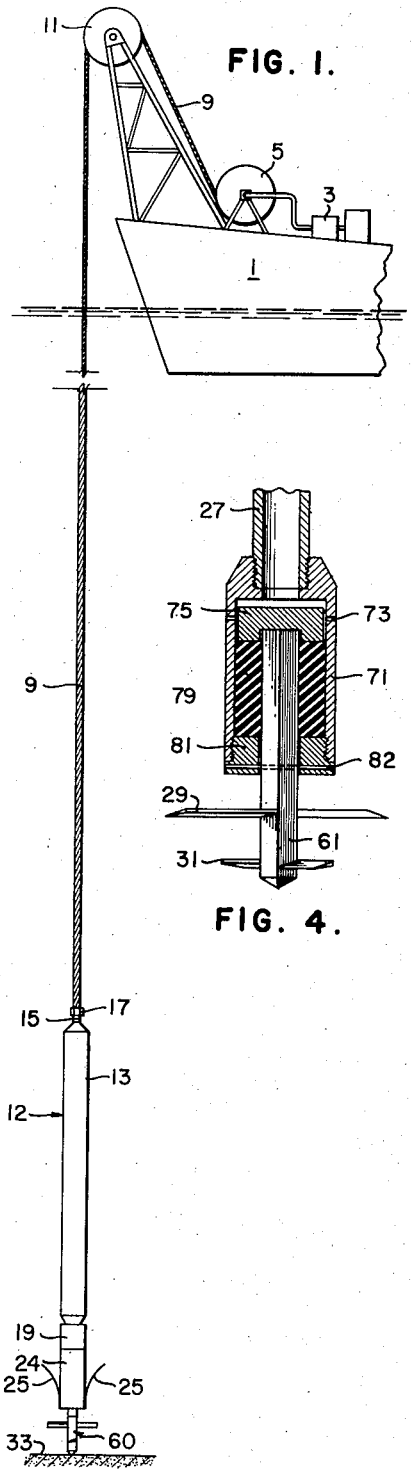
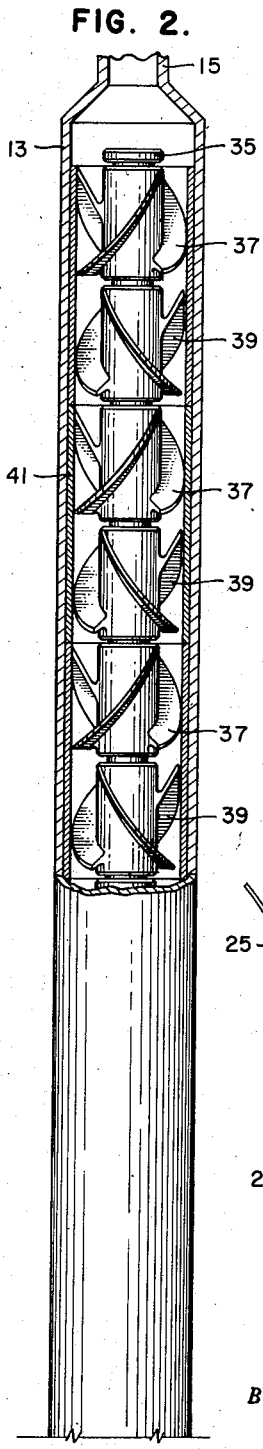
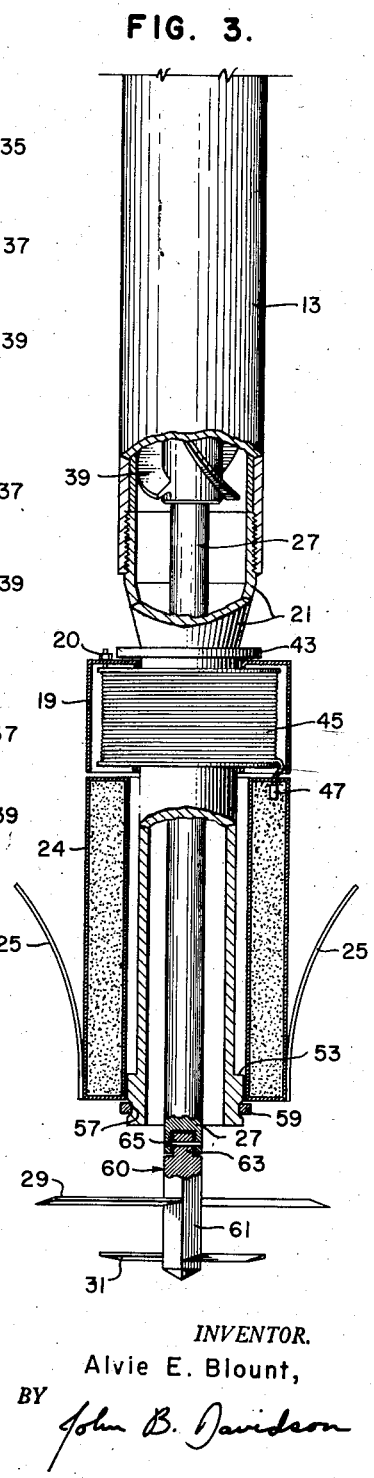
INVENTOR.
Alvie E. Blount,
BY John B. Davidson
ATTORNEY.

United States Patent Office 2,880,966
Patented Apr. 7, 1959

2,880,966

CHARGE-PLANTING MOTOR-BIT DRILL

Alvie E. Blount, Houston, Tex., assignor, by mesne assignments, to Jersey Production Research Company, Tulsa, Okla., a corporation of Delaware Application January 14, 1957, Serial No. 633,955

12 Claims. (Cl. 255—4)

This invention relates to apparatus for drilling into water-submerged earth formations, and more particularly to apparatus such as used in seismic prospecting. The invention provides improved apparatus for drilling into submerged earth formations and for placing explosive charges in the earth, which apparatus may be easily controlled from the surface of the water.

The problems associated with seismic prospecting in water-covered areas are accentuated by the difficulty in placing seismic sources, such as explosive charges, sufficiently deep in the earth to minimize multiple reflections between the water's surface and the ocean floor, and to minimize the extraneous elastic waves generated as a result of the sudden displacement of a considerable volume of water. It has been found that these difficulties can be overcome to a large extent when the explosive charge is placed at a considerable depth beneath the floor of the water-covered area. Prior art apparatus, such as described in U. S. Patent No. 2,669,431 to J. H. Crowell, and U. S. Patent No. 2,614,804 to C. H. Carlisle, are limited to placing charges at depths not greater than 30 or 40 feet under the earth's surface. The apparatus used heretofore has also been unduly cumbersome and complicated, and not particularly well adapted to the physical abuse thereof that is inherent in seismic operations.

Seismic prospecting in submerged areas is expensive, and it is mandatory that expenses be kept to a minimum. This means that the earth-boring apparatus for placing seismic charges should drill rapidly and should be capable of being transported quickly from one drilling locale to another. Further, the apparatus should operate satisfactorily with a minimum amount of preventive maintenance. To minimize damage to the earth-boring equipment, the drilling aparatus should be capable of being removed from the area of the explosive charge when the charge is detonated, along with as much as possible of the apparatus other than the explosive charge itself.

Accordingly, one object of this invention is to provide earth-boring apparatus for seismic surveying in submerged areas that is capable of rapidly drilling boreholes to 100 feet or more and placing explosive charges therein.

Still another object is to provide simple, rugged earth-boring apparatus for seismic surveying in submerged areas that is capable of withstanding considerable abuse with a minimum amount of maintenance.

Yet another object is to provide earth-boring apparatus for seismic surveying in submerged areas wherein as much as possible of the apparatus may be retrieved after the explosive charge has been planted.

Other objects and features of the invention will become apparent upon consideration of the following description thereof, wherein:

Fig. 1 is a schematic representation showing the relationship between the underwater drilling apparatus and a ship from which drilling operations are conducted;

Fig. 2 is an elevation view of a portion of the earth-drilling apparatus showing particularly the blading arrangement of a water-driven turbine that has been found particularly adept for use with the invention;

Fig. 3 is an elevation view, partially in cross-section, of the earth-drilling and charge-planting apparatus that is the subject matter of the invention. Figs. 2 and 3 taken together depict an operative embodiment of the invention;

Fig. 4 is an elevation view, partially in cross-section, depicting a preferred apparatus for coupling together the bit and drive shaft of the earth-boring apparatus shown in Figs. 2 and 3.

According to one aspect of the invention, a motor preferably powered by pressurized water from an external source, such as a pump on the boat from which drilling operations are conducted, is detachably coupled to an expendable earth-boring bit. A water-driven turbine is enclosed in a casing, at the bottom end of which are secured an explosive charge receptacle or container and a container for cap-wire for detonating the charge. Secured to the explosive charge container at the bottom end thereof, are a plurality of flexible, upward extending barbs which permit the explosive-charge container to be lowered through earth formations, but which oppose upward movement of the charge container after it has been lowered into the earth. Means are provided for supporting the weight of the cap-wire container and the explosive-charge receptacle while the apparatus is moving downward through the earth, but which yields to pressure greater than the weight of the two containers to permit the charge container to slip off the lower end of the casing. Means are further provided for retaining the cap-wire on the casing after the charge container has been slipped off the lower end thereof.

According to one feature of the invention, the detachable expendable bit is secured to the turbine shaft by means of a deformable, compressible member fitting about a shaft connected to the bit and which is fitted within an enclosed extension of the turbine shaft. A piston member at the upper end of the deformable member bears against the deformable member when water pressure is applied to the upper end of the hollow turbine so that the deformable member squeezes against both the drill bit shaft and the extension of the turbine shaft, to provide a substantially rigid coupling therebetween. As soon as the water pressure is removed, the deformable member reverts to its original shape, allowing the bit to be released upon upward movement of the turbine shaft.

With reference now to Figs. 1 through 3, reference numeral 1 depicts a boat upon which is supported a pump 3 coupled to a hose 9 that is wound on reel 5 and which is connected to earth-boring apparatus 12 by means of clamp 17. The clamp secures the water hose 9 to neck 15 of motor 13. The motor 13 is preferably water-powered, although it may be electrically powered if desired, in which case a submersible-type electric motor should be used.

The motor has a drive shaft 27 that is coupled to a detachable bit 61 including blades 29 and 31. At the lower end of a reduced section of the motor casing are secured receptacle 24 and container 19 for a dynamite charge and a coil of detonator wire or cap-wire, respectively. At the lower end of the charge receptacle 24 are secured a plurality of flexible barbs 25 which permit the dynamite charge to be lowered into the earth without substantial opposition, but which very effectively opposes upward movement of the charge receptacle as soon as it has been lowered into the earth. The water-covered earth's surface into which the bit is to drill is designated by reference numeral 33.

Figs. 2 and 3 show in greater detail the water-powered motor and the explosive charge planting apparatus which are shown very schematically in Fig. 1. Fitting very snugly within the interior of motor casing 13 is an interior casing 41 supporting stator blades 37 of a multi-element turbine type water-motor. Between every other stator blade 37 is a rotor blade 39 which is affixed to turbine drive shaft 27 by a friction fit or other suitable means. Within every other stator there should be a water-lubricated rubber bearing, such as is commonly used on shafts of boats, so that the drive shaft 27 may rotate freely without danger of binding. A suitable motor of this type has a speed of 3500 r.p.m. and uses 92 gallons of water per minute.

At the lower end of the motor casing below the last blading member is secured a casing extension including a snout 21 having a section of reduced diameter which may serve as a mandrel and to which is secured an explosive charge container or receptacle 24 and a cap-wire container 19. An annular stop member 43 affixed to the snout 21 prevents upward movement of the cap-wire container and the charge container while the apparatus is drilling downwardly into the earth. As mentioned previously, a plurality of barbs 25 are affixed to the lower end of the explosive charge container. The barbs may be of 14 gauge spring steel, having dimensions 1" x 10".

The lower end of the explosive charge fits loosely about an annular stop 53, the purpose of which is to prevent the cap-wire can from slipping off of the lower end of snout 21 when the apparatus is being raised after the drilling operation has ceased. As shown, the cap-wire container is of somewhat smaller inside diameter than the inside diameter of the explosive charge container. The wire 45 within the cap-wire container 19 is connected to a cap 47 within charge receptacle 24. The cap-wire is wound so that it will readily pay out without breaking as the cap wire container is raised to the surface of the water. The bottom of container 19 may be open, in which case a latch 20 must be used to keep the cap-wire spool within container 19.

The cap-wire container 19 and explosive charge receptacle 24 are supported by retaining means 59 which will support the weight of the two containers but which will yield against the retarding forces of barbs 25 as the motor and casing are withdrawn upwardly to permit explosive charge container 24 to slip off the lower end of snout 21. Retaining means 59 may be a frangible lock washer or a very weak snap washer fitting into an annular groove 57 at the lower end of snout 21.

At the lower end of motor-driven shaft 27 there is secured an expendable bit 60 comprising a shaft 61 having a square or rectangular cross-section, and a pair of straight-edged blades 29 and 31 at right angles to and vertically disposed with respect to each other. Shaft 61 is secured to motor drive shaft 27 by means of a reduced diameter extension 63 fitting into a bore within the lower end of motor shaft 27. A shear pin 65 extending through the motor-shaft 27 and reduced diameter extension 63 physically joins the two members together. In order to reduce counter torques exerted on blades 31 and 29 by the earth through which the blades cut, blade 31 has only half the length of blade 29; thus blade 31 will bore a hole having one diameter, which hole will be subsequently enlarged by blade 29. Each of the two blades have a very small pitch with respect to a plane perpendicular to the axis of drive shaft 27, the blades having pitch of about 1/8" for a blade diameter of about 2". Water coming through the lower end of snout 21 has a very low velocity and is not particularly effective to wash away cuttings; however, it has been found that with the particular bit and configuration shown, very rapid drilling may be effected without danger of fouling of the bit by earth cuttings.

In operation, pressurized water from pump 3 drives the rotor members of water-motor 12 at a very high speed. The apparatus has been found effective for drilling speeds as high as 10 feet per minute through hard sand and shale.

After the charge has been lowered to the desired depth in the earth, the direction of rotation of reel 5 is reversed so as to withdraw the motor 12 upwardly. Explosive charge receptacle 24 slides off the lower end of snout 21 and shear pin 65 shears, releasing expendable bit 60. Cap-wire can 19 is withdrawn upwardly inasmuch as stop member 53 prevents it from sliding off the end of snout 21. When the cap-wire can reaches the surface, the explosive charge can be detonated at any convenient time.

Certain earth formations have been found to offer such high resistance to drilling operations that the simple bit-coupling device depicted in Fig. 3 is unsuitable for drilling therethrough. Shear pin 65 cannot be particularly strong inasmuch as the bit is to be detached from the drive shaft 27 and so, when drilling through shale or through earth formations such as found under Lake Pontchartrain, the shear pin usually gives way. The apparatus depicted in Fig. 4 has been found to provide suitable coupling under all drilling conditions. Turbine shaft 27 is coupled to bit shaft 61 by means of a casing member 71 threadingly engaging the lower end of shaft 27. Turbine shaft 27 must be hollow so that water pressure at the upper end 35 thereof (see Fig. 2) is transmitted therethrough to casing 71. A deformable member 79 of rubber or a rubber-like material surrounds bit shaft 61, but is in very loose engagement therewith so that the bit shaft will slide readily out of casing 71. The casing has a retaining member 81 threadingly engaging the interior of the lower end thereof so as to support deformable member 79. A very weak shear pin 82 is provided to hold shaft 61 as the assembly is lowered to the initial drilling position. The shear pin should shear readily when the bit is struck by charge receptacle 24 after it slips off of snout 21. A piston 75 bears against the upper end of deformable member 79 and small relief ports 73 are provided in the casing 71 between the upper end of deformable member 79 and the lower end of shaft 27. Piston 75 is adapted for bi-lateral movement within casing 71. Water pressure exerted on the upper face of piston 75 causes the piston to bear against deformable member 79 so that it effectively squeezes against shaft 61 to provide a substantially rigid connection between shaft 61 and casing 71. In order to insure against counter-rotation of shaft 61 as drive shaft 27 is rotated by motor 12, the shaft 61 should be of square or rectangular cross-section, as should the central bore of deformable member 79.

Under certain circumstances, the cap-wire need not be carried by the drill as indicated in Fig. 3. Instead the wire may be unreeled from on board ship and may run directly to the charge. With this arrangement, the tension on the cap-wire line will provide an indication of whether or not the bit, charge and cap have come off the drill when the drill is being withdrawn from the hole.

Although the embodiments described in the preceding specification are preferred, other modifications will be apparent to those skilled in the art which do not depart from the scope of the broadest aspect of the invention.

What is claimed is:

1. Apparatus for drilling a borehole in the earth and for planting an explosive charge in the borehole, comprising: a quick-detachable earth boring bit; a casing; a motor-driven shaft journalled within said casing, said casing having an open end through which said shaft projects for coupling to said bit; a motor coupled to said shaft; an explosive charge receptacle; upwardly and outwardly extending flexible barbs affixed to said receptacle adapted to permit downward movement of said receptacle through the borehole drilled by said bit without substantial opposition, and extending outwardly from said receptacle a distance sufficient to engage and penetrate the borehole walls to oppose upward movement of said receptacle; a container for reelable cap-wire for connection to a cap within said container to detonate said explosive charge, said receptacle and said container surrounding and being slidable on said casing; stop means affixed to said casing for holding said container on said casing, said receptacle being fitted about and adapted to slide over said stop means and off of said casing; said receptacle being positioned between said container and said stop means; an annular groove in said casing; a detachable lock ring in said annular groove for supporting the weight of said receptacle and said container while said receptacle is being lowered into the earth, yieldable under opposition of said barbs to permit said receptacle to slide off of said casing when said casing is withdrawn upwardly through the borehole.

2. Apparatus for drilling a borehole in the earth and for planting an explosive charge in the borehole, comprising: a quick-detachable earth boring bit; a hollow casing having an open end; a motor-driven bit-drive shaft journalled within said casing, said shaft extending through said open end and being adapted to be coupled to said detachable bit; a motor coupled to said shaft; bit coupling means associated with said shaft for detachably coupling said bit to said shaft; an explosive charge receptacle; upwardly and outwardly extending flexible barbs affixed to said receptacle adapted to permit downward movement of said receptacle through the borehole drilled by said bit without substantial opposition, and extending outwardly from said receptacle a distance sufficient to engage and penetrate the borehole walls to oppose upward movement of said receptacle through said borehole; a container for reelable cap-wire for connection to a cap within said container to detonate said explosive charge, said receptacle and said container surrounding and being slidable on said casing; stop means affixed to said casing for holding said container on said casing, said receptacle being fitted about and adapted to slide over said stop means off of said casing; said receptacle being positioned between said container and said stop means; an annular groove in said casing; a lock ring in said annular groove for supporting the weight of said receptacle and said container while said receptacle is being lowered into the earth, yieldable under opposition of said barbs to permit said receptacle to slide off of said casing when said casing is withdrawn upwardly through the borehole drilled by said bit.

3. Apparatus for drilling a borehole in the earth and for planting an explosive charge in the borehole, comprising: a shaft; an expendable bit coupled to said shaft on an end thereof by means including shear pin means; said bit having spaced-apart, straight-edge cutting edges revolving in planes normal to the axis of said shaft; a water-driven turbine motor; an explosive charge receptacle; a cap wire container; a casing for said shaft comprising a first portion for enclosing said water-driven turbine motor coupled to said shaft for rotation of said shaft, and a reduced-diameter second portion coupled to said first portion for serving as a mandrel for said explosive charge receptacle and said cap-wire container; said turbine motor comprising first, fixed reaction blade sections fixedly held by said casing, and rotatable blade sections between said first sections connected to said shaft, said shaft being journalled within said fixed blade sections; a source of fluid pressure; means coupling said source of fluid pressure to said casing to energize said turbine motor, the discharge end of said turbine motor exhausting through an open end of said second portion of said casing; upwardly and outwardly extending flexible barb means affixed to said receptacle adapted to permit substantially unimpeded downward movement of said receptacle through the borehole drilled by said bit, and extending outwardly from said receptacle a distance sufficient to engage and penetrate the borehole walls to oppose upward movement of said receptacle; said cap-wire container being for reelable cap-wire for connection to a cap within said container, to detonate the explosive charge within said receptacle; first stop means on said mandrel near said open end thereof for retaining said container on said mandrel; said receptacle and said container being fitted about and slidable on said mandrel, said receptacle additionally being positioned between said container and said stop means and fitted about and slidable over said stop means; an annular groove in said mandrel; a lock ring in said annular groove for supporting the weight of said receptacle and said container while said receptacle is being lowered into the earth, said lock ring being yieldable under opposition to said barbs to permit said receptacle to slide off of said mandrel when said casing is withdrawn upwardly from the earth.

4. Apparatus for drilling a borehole in the earth and for planting an explosive charge in the borehole, comprising: a quick-detachable earth boring bit; a casing; a motor-driven shaft journalled within said casing, said casing having an open end through which said shaft projects for coupling to said bit; a motor coupled to said shaft; an explosive charge receptacle; upwardly and outwardly extending flexible barbs affixed to said receptacle adapted to permit downward movement of said receptacle through a borehole drilled by said bit, and extending outwardly from said receptacle a distance sufficient to engage and penetrate the borehole walls to oppose upward movement of said receptacle; and support means for said receptacle detachably affixed to said casing, said support means being yieldable under opposition of said barbs to permit said receptacle to slide off of said casing when said casing is withdrawn upwardly from the earth.

5. Apparatus for drilling a borehole in the earth and for planting an explosive charge in the borehole, comprising: a quick-detachable earth boring bit; a casing; a motor-driven shaft journalled within said casing having an open end through which said shaft projects for coupling to said bit; a motor coupled to said shaft; an explosive charge receptacle longitudinally slidable along the exterior of said casing; upwardly and outwardly extending flexible barbs affixed to said receptacle adapted to permit downward movement of said receptacle through a borehole drilled by said bit, and extending outwardly from said receptacle a distance sufficient to engage and penetrate the borehole walls to oppose upward movement of said receptacle; an annular groove in said casing; a detachable lock ring in said groove for supporting the weight of said receptacle while said receptacle is being lowered into the earth, yieldable under opposition of said barbs to permit said receptacle to slide off of said casing when said casing is withdrawn upwardly from the earth.

6. Apparatus for drilling a borehole in the earth and for planting an explosive charge in the borehole, comprising: a quick-detachable earth boring bit; a casing; a motor-driven shaft journalled within said casing having an open end through which said shaft projects for coupling to said bit; a motor coupled to said shaft; an explosive charge receptacle longitudinally slidable along the exterior of said casing; upwardly and outwardly extending flexible barbs affixed to said receptacle adapted to permit downward movement of said receptacle through a borehole drilled by said bit, and extending outwardly from said receptacle a distance sufficient to engage and penetrate the borehole walls to oppose upward movement of said receptacle; an annular groove in said casing; a detachable lock ring in said groove for supporting the weight of said receptacle while said receptacle is being lowered into the earth, yieldable under opposition of said barbs to permit said receptacle to slide off of said casing when said casing is withdrawn upwardly from the earth; and means coupling said bit to said shaft adapted to release said bit from said shaft when said shaft is withdrawn upwardly from the earth.

7. Apparatus for drilling a borehole in the earth and for planting an explosive charge in the borehole, comprising: a quick-detachable earth boring bit; a casing; a motor-driven shaft journalled within said casing, said casing having an open end through which said shaft projects, said shaft being detachably coupled to said bit; a motor for driving said shaft; an explosive charge receptacle longitudinally slidable along the exterior of said casing; first means connected to said receptable for permitting downward movement of said receptacle as said receptacle is lowered into a borehole drilled by said bit, and for opposing upward movement of said receptacle; and support means for said receptacle detachably affixed to said casing, yieldable under opposition of said first means to permit said receptacle to slide off of said casing when said casing is withdrawn upwardly from the earth.

8. Apparatus for drilling a borehole in the earth and for planting an explosive charge in the borehole, comprising: a quick-detachable earth boring bit; a casing; a motor-driven shaft hollow along its length journalled within said casing, said casing having an open end through which said shaft projects, said shaft being detachably coupled to said bit; a motor coupled to said shaft; an explosive charge receptacle; upwardly and outwardly extending flexible barbs affixed to said receptacle adapted to permit substantially unimpeded downward movement of said receptacle as said receptacle is lowered into a borehole drilled by said bit, and extending outwardly from said receptacle a distance sufficient to engage and penetrate the borehole walls to oppose upward movement of said receptacle; a container for reelable cap-wire for connection to a detonating cap within said container; said receptacle and container being fitted about and slidable along said casing; stop means affixed to said casing near the lower end of said casing for holding said container on said casing; said receptacle being further positioned between said container and said stop means, and fitted about said stop means to slide over said stop means and off of said casing; an annular groove in said casing; a detachable snap ring for supporting the weight of said receptacle and said container while said receptacle is being lowered into the earth, yieldable under opposition of said barbs to permit said receptacle to slide over said stop means and off of said casing when said casing is withdrawn upwardly through the earth; a second shaft attached to said bit; coupling means for coupling said motor-driven shaft to said second shaft responsive to fluid pressure within said motor-driven shaft; said coupling means comprising a second casing attached to the projecting end of said motor-driven shaft and enclosing a chamber in fluid communication with the interior of said motor-driven shaft; an opening within said second casing through which said second shaft may project; and means including compressible packing means within said second casing surrounding said second shaft when said second shaft projects into said second casing, responsive to an increase in fluid pressure within said motor-driven shaft to firmly bind said second shaft to said motor-driven shaft.

9. Apparatus for drilling a borehole in the earth and for planting an explosive charge in the borehole, comprising: a quick-detachable earth boring bit; a casing; a motor-driven shaft hollow along its length journalled within said casing, said casing having an open end through which said shaft projects, said shaft being detachably coupled to said bit; a motor coupled to said shaft; an explosive charge receptacle; upwardly and outwardly extending flexible barbs affixed to said receptacle adapted to permit substantially unimpeded downward movement of said receptacle as said receptacle is lowered into a borehole drilled by said bit, and extending outwardly from said receptacle a distance sufficient to engage and penetrate the borehole walls to oppose upward movement of said receptacle; a container for reelable cap-wire for connection to a detonating cap within said container; said receptacle and container being fitted about and slidable along said casing; stop means affixed to said casing near the lower end of said casing for holding said container on said casing; said receptacle being further positioned between said stop means and said container, and fitted about said stop means to slide over said stop means off of said casing; an annular groove in said casing; a detachable snap ring for supporting the weight of said receptacle and said container while said receptacle is being lowered into the earth, yieldable under opposition of said barbs to permit said receptacle to slide over said stop means off of said casing when said casing is withdrawn upwardly; a second shaft for attachment to said detachable bit; coupling means for coupling said motor-driven shaft to said second shaft responsive to fluid pressure within said motor-driven shaft, said coupling means comprising a second casing attached to the projecting end of said motor-driven shaft and enclosing a chamber in fluid communication with the interior of said motor-driven shaft, said second casing having an opening through which said second shaft may project; compressible packing means in said chamber surrounding said second shaft when said second shaft projects into said second casing; and piston means within said chamber between said first shaft and said packing means adapted to bear against said compressible packing means so as to distort said packing means upon application of fluid pressure within said motor-driven shaft to firmly bind said second shaft to said motor-driven shaft, said packing means resuming substantially its original shape upon removal of said fluid pressure to release said second shaft from said motor-driven shaft.

10. Apparatus for driving a detachable earth boring bit and carrying a detachable explosive charge during drilling operations comprising: a casing; a motor-driven shaft journalled in said casing; a motor coupled to said shaft; said casing having an open end through which said shaft projects; said shaft being adapted to receive a quick-detachable earth boring bit at the end thereof projecting through said open end of said casing; an explosive charge receptacle longitudinally slidable along the exterior of said casing and adapted to slide off of said open end; first means connected to said receptacle for permitting downward movement of said receptacle as said receptacle is lowered into the earth on said casing, and for opposing upward movement of said receptacle after said receptacle is below the earth's surface; and support means for said receptacle detachably affixed to said casing, said support means being yieldable under opposition of said first means to permit said receptacle to slide off of said casing when said casing is withdrawn upwardly from the earth.

11. Apparatus for driving a detachable earth boring bit and carrying a detachable explosive charge during drilling operations comprising: a casing; a motor-driven shaft journalled in said casing; a motor coupled to said shaft; said casing having an open end through which said shaft projects; said shaft being adapted to receive a quick-detachable bit at the end thereof projecting through open end of said casing; an explosive charge receptacle longitudinally slidable along the exterior of said casing and adapted to slide off of said open end; barb means affixed to said receptacle extending upwardly and outwardly from said receptacle adapted to permit substantially unimpeded downward movement of said receptacle into the earth with said casing during drilling operations, and further adapted to engage earth formations surrounding said casing when said casing is below the earth's surface, to oppose upward movement of said receptacle; and support means for said receptacle detachably affixed to said casing, said support means being yieldable under opposition of said barbs to upward movement of said receptacle to permit said receptacle to slide off of said casing when said casing is withdrawn upwardly from the earth.

12. Apparatus for driving a detachable earth boring bit and carrying a detachable explosive charge during drilling operations comprising: a casing, a motor-driven shaft journalled in said casing; a motor coupled to said shaft; said casing having an open end through which said shaft projects; said shaft being adapted to receive a quick-detachable bit at the end thereof projecting through said open end of said casing; an explosive charge receptacle longitudinally slidable along the exterior of said casing and adapted to slide off of said open end; barb means affixed to said receptacle extending upwardly and outwardly from said receptacle adapted to permit substantially unimpeded downward movement of said receptacle into the earth with said casing during drilling operations, and further adapted to engage earth formations surrounding said casing when said casing is below the earth's surface, to oppose upward movement of said receptacle; an annular groove in said casing; a detachable lock ring in said groove for supporting the weight of said receptacle, yieldable under opposition of said barbs to permit said receptacle to slide off of said casing.

References Cited in the file of this patent

UNITED STATES PATENTS

| | | |
|---|---|---|
| 1,770,488 | Lechamp et al. | July 15, 1930 |
| 2,089,230 | Thowless | Aug. 10, 1937 |
| 2,145,262 | Hokanson | Jan. 31, 1939 |
| 2,353,534 | Yost | July 11, 1944 |
| 2,614,804 | Carlisle | Oct. 21, 1952 |
| 2,669,431 | Crowell | Feb. 16, 1954 |
| 2,773,669 | Norman | Dec. 11, 1956 |